United States Patent
Fang

(10) Patent No.: US 10,776,757 B2
(45) Date of Patent: Sep. 15, 2020

(54) SYSTEMS AND METHODS TO MATCH JOB CANDIDATES AND JOB TITLES BASED ON MACHINE LEARNING MODEL

(71) Applicant: Facebook, Inc., Menlo Park, CA (US)

(72) Inventor: Miaoqing Fang, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 998 days.

(21) Appl. No.: 14/987,639

(22) Filed: Jan. 4, 2016

(65) Prior Publication Data
US 2017/0193451 A1 Jul. 6, 2017

(51) Int. Cl.
G06Q 10/10 (2012.01)
G06Q 10/06 (2012.01)
G06N 20/00 (2019.01)
G06F 16/93 (2019.01)

(52) U.S. Cl.
CPC ......... *G06Q 10/1053* (2013.01); *G06F 16/93* (2019.01); *G06N 20/00* (2019.01); *G06Q 10/067* (2013.01)

(58) Field of Classification Search
None
See application file for complete search history.

(56) References Cited

U.S. PATENT DOCUMENTS

| | | | | |
|---|---|---|---|---|
| 6,728,695 | B1* | 4/2004 | Pathria | G06F 17/2715 |
| 2014/0122355 | A1* | 5/2014 | Hardtke | G06Q 10/105 |
| | | | | 705/321 |
| 2014/0297266 | A1* | 10/2014 | Nielson | G09B 19/06 |
| | | | | 704/9 |
| 2015/0199744 | A1* | 7/2015 | Tolvanen | G06Q 30/0631 |
| | | | | 707/737 |
| 2015/0242815 | A1* | 8/2015 | Velasco | H04L 67/02 |
| | | | | 705/321 |
| 2017/0004184 | A1* | 1/2017 | Jain | G06F 40/289 |
| 2017/0031894 | A1* | 2/2017 | Bettersworth | G06F 17/277 |
| 2017/0032036 | A1* | 2/2017 | McCain | G06F 16/951 |
| 2017/0185911 | A1* | 6/2017 | Fang | G06N 5/022 |
| 2017/0193089 | A1* | 7/2017 | Fang | G06Q 10/105 |
| 2017/0193394 | A1* | 7/2017 | Fang | G06Q 10/105 |
| 2017/0286865 | A1* | 10/2017 | Fang | G06N 20/00 |
| 2017/0286914 | A1* | 10/2017 | Fang | G06Q 10/1053 |
| 2017/0337518 | A1* | 11/2017 | Fang | G06N 20/00 |
| 2018/0130024 | A1* | 5/2018 | Fang | G06N 20/00 |
| 2018/0197108 | A1* | 7/2018 | Fang | G06Q 30/02 |

\* cited by examiner

*Primary Examiner* — J. H. Hur
(74) *Attorney, Agent, or Firm* — Sheppard Mullin Richter & Hampton LLP

(57) ABSTRACT

Systems, methods, and non-transitory computer readable media are configured to receive a resume corpus. A machine learning model is trained based on terms from the resume corpus. A job title for a user is determined based on profile information provided to the model.

18 Claims, 8 Drawing Sheets

SYSTEMS AND METHODS TO MATCH JOB CANDIDATES AND JOB TITLES BASED ON MACHINE LEARNING MODEL

FIELD OF THE INVENTION

The present technology relates to the field of machine learning. More particularly, the present technology relates to techniques for matching job candidates with job titles based on profile information applied to a machine learning module.

BACKGROUND

Today, people often utilize computing devices for a wide variety of purposes. Users can use their computing devices, for example, to communicate and otherwise interact with other users. Such interactions are increasingly popular over a social networking system.

Various types of information can be maintained by a social networking system. One type of information is profile information, such as personal information and professional information, which can be shared by users according to their privacy preferences. The personal information about a user can include various types of information, such as name, age, location, social status, and the like. The professional information about the user can include various types of information, such as profession, educational emphasis, and educational degrees.

SUMMARY

Various embodiments of the present technology can include systems, methods, and non-transitory computer readable media configured to receive a resume corpus. A machine learning model is trained based on terms from the resume corpus. A job title for a user is determined based on profile information provided to the model.

In an embodiment, the user is associated with an employee of an organization recruiting for the job title.

In an embodiment, the user and the employee are connections on a social networking system.

In an embodiment, the model is based at least in part on a technique that creates vector representations of the terms from the resume corpus in a vector space based on meaning of the terms.

In an embodiment, the determining further comprises: receiving selected job titles; and determining vector representations in a vector space for the selected job titles. The vector representations for the selected job titles can constitute anchor points in the vector space.

In an embodiment, the profile information is organized into profile information types.

In an embodiment, the determining further comprises: identifying a vector representation in the vector space for each term of each profile information type; and calculating a pairwise distance between each vector representation of each term of each profile information type and each anchor point.

In an embodiment, the determining further comprises: for each term of each profile information type, identifying an anchor point that is nearest to the term; and for each profile information type, selecting an identified anchor point that is identified most frequently.

In an embodiment, the identifying an anchor point further comprises: applying a threshold distance value; and discarding an anchor point identified from a calculation of pairwise distance when the pairwise distance does not satisfy the threshold distance value.

In an embodiment, the determining further comprises: choosing an identified anchor point associated with a profile information type based on a rule that assigns hierarchical importance levels for the profile information types.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
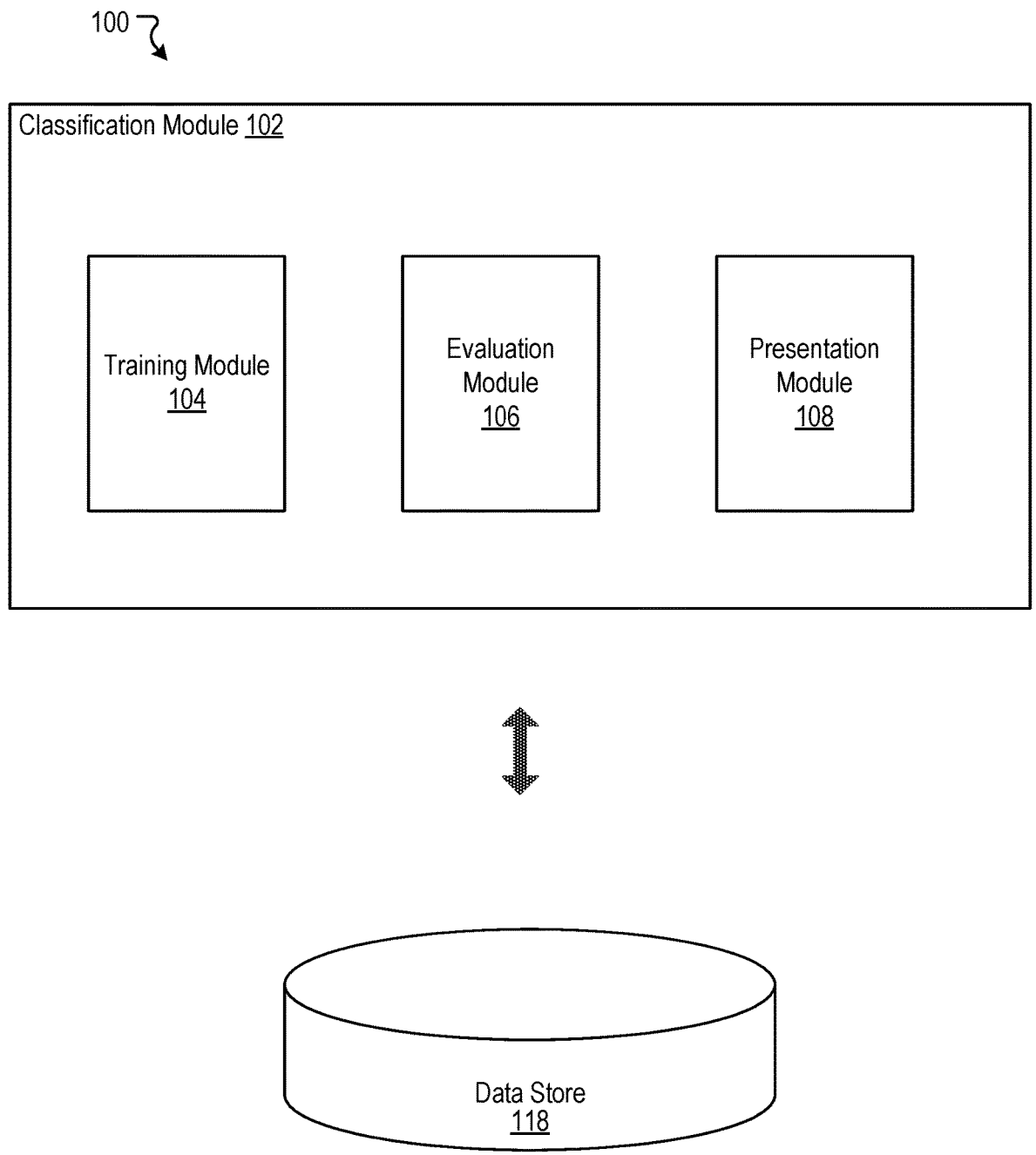
FIG. 1 illustrates a system including an example classification module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Matching a User with a Job Title Based on Profile Information

As mentioned, various types of information can be maintained by a social networking system. One type of information is profile information, such as personal information and professional information, which can be shared by users according to their privacy preferences. The personal information about a user can include various types of information, such as name, age, location, social status, and the like. The professional information about the user can include various types of information, such as profession, educational emphasis, and educational degrees.

Despite the utility of such profile information for individual users of a social networking system, organizations have not been able to leverage the full potential of such information. One common challenge confronted by organizations, such as employers, is identifying and recruiting new employees with suitable experience. Common computer implemented techniques for an organization to find job candidates involve publishing advertisements for job positions (or job titles), hiring recruiters to find candidates for the job positions, and relying on existing employees to refer candidates. However, these techniques are rarely, if ever, a reliable, consistent source of qualified job candidates. In many instances, these techniques are limited by the availability of a limited pool of known job candidates during a brief window of time with few guarantees that the pool is well suited to the job positions. Further, these techniques tend to rely on ad hoc identifications of job candidates that fail to systematically leverage the power of a community of a social networking system to identify a comprehensive pool of suitable job candidates over time. Even when an job candidate is identified according to such conventional techniques, her identification may reflect a generalized determination that does not properly match the candidate with a suitable type of job position.

An improved approach rooted in computer technology overcomes the foregoing and other disadvantages associated with conventional approaches specifically arising in the realm of computer technology. Systems, methods, and computer readable media of the present technology can accurately classify a user with an appropriate type of job title based on profile information. The profile information can be maintained by a social networking system. During a training stage, a machine learning model can be trained using terms from resumes (or curricula vitae). The model can be based on a technique that converts the terms into vector representations in a vector space based on semantics. In an evaluation stage, job titles of interest can be converted to vector representations constituting anchor points in the vector space. Various profile information types of the user, such as job titles, educational majors, and educational degrees, can be processed by application of the profile information types to the model. A vector representation for each term of a profile information type can be identified. For each vector representation of each term of a profile information type, a nearest anchor point can be identified subject to a threshold distance value condition. Based on a hierarchical rule, an anchor point can be chosen from the identified anchor points associated with terms of the profile information types. The chosen anchor point can represent a job title matched to the user. In some instances, the user can be a connection within a social network supported by a social networking system. More details regarding the present technology are described herein.

FIG. 1 illustrates an example system 100 including an example classification module 102 configured to classify job candidates with suitable job titles (or job roles), according to an embodiment of the present technology. The classification module 102 can match users with job titles to facilitate recruitment of employees (or contractors) by an organization. In some embodiments, the users can be connections of employees of (or contractors with) the organization. In this manner, the classification module 102 can leverage the power, resources, and information of social networks associated with employees of an organization to enhance recruiting capabilities of the organization. An organization can be any entity, such as a company, an establishment, a non-profit, a business, etc. The organization can be in any industry, such as aerospace and defense, agriculture, automotive, chemicals, construction, consumer goods and services, energy, financial services, firearms, food and beverage, health care, information and technology (e.g., software, hardware, etc.), real estate, manufacturing, mining and drilling, pharmaceuticals and biotechnology, publishing, telecommunications, transportation, etc. While a technology company may be exemplarily discussed in certain contexts for ease of explanation herein, a company of any industry type or endeavor can be applicable to the present technology. Further, the present technology can be generally applied for a variety of purposes, such as targeting. For example, if a person claims to like a certain product or service, the present technology can be used to provide to the person related products or services. The classification module 102 can include a training module 104, an evaluation module 106, and a presentation module 108. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the classification module 102 can be implemented in any suitable combinations.

The training module 104 can develop a machine learning model for creating a vector space of vector representations of terms that appear in a resume corpus. A term can be one or more words. The model can be trained using terms that appear in the resume corpus. In some instances, the resume corpus can include resumes received by an organization for which the classification module 102 is to classify users (or job candidates) for job titles. For example, the resumes can include resumes of employees of the organization. As another example, the resumes also can include employees of other organizations similar to or of the same type as the organization. The number of resumes provided to train the model can be any suitable number of resumes. For instance, the number of resumes can be approximately one million. In other instances, the number of resumes can be a larger or smaller value. Terms from the resume corpus can be identified and extracted to train the model. The vector space of vector representations of the terms can constitute a dictionary of the terms.

The model can be trained using any suitable technique (or algorithm) that can create a vector space of vector representations of terms from resumes based on meaning of the terms. In this regard, for terms that are relatively close in meaning, the technique can create vector representations of the terms that are relatively close to one another in the vector space. Likewise, for terms that are relatively far in meaning, the technique can create vector representations of the terms that are relatively far to one another in the vector space. In other words, terms with similar or identical meanings are clustered together. In some embodiments, the technique to create vector representations of terms can be based at least in part on a word2vec technique.

Certain terms can be eliminated from training of the model to account for anomalies or mistakes in the resume corpus or to enhance the quality of the data provided for training. In some embodiments, a number of appearances of a term must satisfy a threshold appearance value before the term is used to train the model. When the number of appearances of the term does not satisfy the threshold appearance value, the term can be eliminated from training of the model. For instance, if the resume corpus is one million resumes, the threshold appearance value can be, for example, 20 or some other suitable value.

The evaluation module 106 can provide profile information of a user to the model to identify a job title suited to the user. The profile information can be organized into types. An anchor point can be identified for a term of each profile information type based on distance between the term and the anchor point in the vector space of the model. A number of occurrences of each anchor point can be counted for each profile information type to select an anchor point for the profile information type. An anchor point from the determined anchor points for the profile information types can be chosen according to a rule. The chosen anchor point can constitute a job title matched to the user. The evaluation module 106 is discussed in more detail herein.

The presentation module 108 can present, via a suitable user interface, matches between users constituting job candidates and suitable job titles, subject to applicable privacy settings. In some embodiments, the presentation module 108 can provide, via a suitable user interface, the presentation to employees of an organization to whom the users are connected in a social network supported by a social networking system. In some embodiments, the presentation module 108 can provide the presentation to members of an organization, such as administrators or human resource personnel, for which the matches are determined. The presentation module 108 can also provide options for the employees to refer the users to the organization.

In some embodiments, the classification module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the classification module 102 can be, in part or in whole, implemented as software running on one or more computing devices or systems, such as on a server or a client computing device. For example, the classification module 102 can be, in part or in whole, implemented within or configured to operate in conjunction or be integrated with a social networking system (or service), such as a social networking system 630 of FIG. 6. As another example, the classification module 102 can be implemented as or within a dedicated application (e.g., app), a program, or an applet running on a user computing device or client computing system. In some instances, the classification module 102 can be, in part or in whole, implemented within or configured to operate in conjunction or be integrated with client computing device, such as a user device 610 of FIG. 6. It should be understood that many variations are possible.

A data store 118 can be configured to store and maintain various types of data, such as the data relating to support of and operation of the classification module 102. The data can include data relating to, for example, a resume corpus, terms extracted from the resume corpus for training, threshold appearance values, terms eliminated from training, a machine learning model to create vector representations of terms, anchor points, threshold distance values, synonymous job titles, matching users and job titles, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the classification module 102 can be configured to communicate and/or operate with the data store 118.

Figure 2:
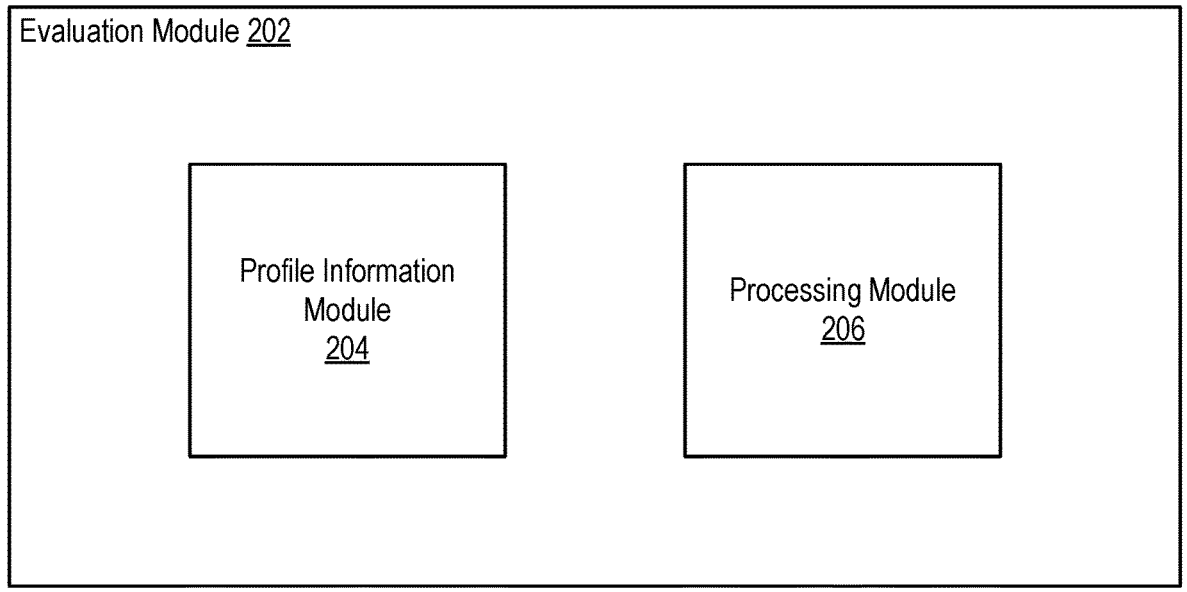
FIG. 2 illustrates an example evaluation module, according to an embodiment of the present technology.

FIG. 2 illustrates an example evaluation module 202, according to an embodiment of the present technology. In some embodiments, the evaluation module 106 of FIG. 1 can be implemented with the evaluation module 202. The evaluation module 202 can apply a machine learning model to profile information types associated with users to determine matches between the users and job titles for an organization. The evaluation module 202 can include a profile information module 204 and a processing module 206.

The profile information module 204 can acquire profile information types associated with users to be matched with suitable job titles. The profile information types can include, for example, professional information, including work history information and educational information. In some embodiments, for a user, the profile information types can include a first type of profile information relating to current and previous job titles of the user; a second type of profile information relating to educational institutions attended by the user (e.g., graduate or professional schools, universities, colleges, etc.), including academic focus or emphasis (e.g., undergraduate major, undergraduate minor, etc.); and, a third type of profile information relating to degrees obtained by the user (e.g., bachelor of science, Ph.D., etc.). In some embodiments, additional or other profile information types can be defined, obtained, and used in accordance with the present technology.

The profile information types can be obtained in a variety of manners. In some embodiments, the profile information types associated with a user can be provided by the user in support of an account of the user on a social networking system or another platform. Subject to applicable privacy settings and permissions, the profile information module 204 can acquire the profile information types maintained by the social networking system or the other platform. For example, such acquisition can be facilitated by an API provided by the social networking system or the other platform to allow access to the profile information types associated with the user. In other embodiments, the profile information module 204 can obtain the profile information types in other manners.

The processing module 206 can process the profile information types associated with a user in connection with a machine learning model to create vector representations of terms from a resume corpus, as discussed herein. Based on such processing, the processing module 206 can identify an anchor point associated with a job title suitable for the user. The processing module 206 is discussed in more detail herein.

Figure 3:
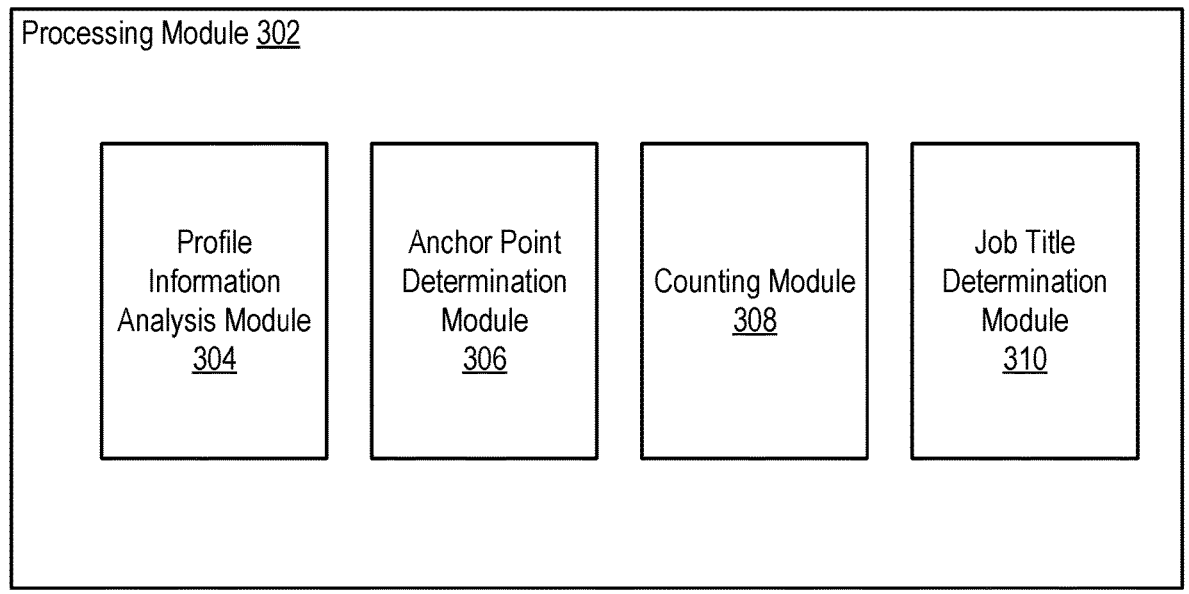
FIG. 3 illustrates an example processing module, according to an embodiment of the present technology.

FIG. 3 illustrates an example processing module 302, according to an embodiment of the present technology. In some embodiments, the processing module 206 of FIG. 2 can be implemented with the processing module 302. The processing module 302 can include a profile information analysis module 304, an anchor point determination module 306, a counting module 308, and a job title determination module 310.

The profile information analysis module 304 can analyze and process profile information associated with a user. The profile information can be identified and organized into profile information types. As discussed herein, the profile information types can include a first type relating to job titles, a second type relating to educational institutions, and a third type relating to degrees. In one example, if the profile information is already organized into types, the profile information analysis module 304 can identify each profile information type based on the organization. In another example, if the profile information associated with the user is unstructured, the profile information analysis module 304 can parse the information to identify the first type of profile information, the second type of profile information, and the third type of profile information. In some cases, the profile information can include multiple entries of profile information types that relate to different jobs held by the user at different times.

For each profile information type, the profile information analysis module 304 can create a list of terms that appear in connection with the profile information type. For example, assume that the profile information reflects that a user had a first job as an analyst, a second job as a software engineer (swe), and a third job as an analyst. Further to this example, assume that the profile information reflects that, prior to all jobs, the user completed an undergraduate major and Ph.D., and that the only area of academic focus reflected in the profile information is "statistics". In this example, the profile information analysis module 304 can create a first list associated with the first type of profile information that contains the terms "analyst", "swe", and "analyst"; a second list associated with the second type of profile information that contains the term "statistics"; and a third list associated with the third type of profile information that contains the terms "B.S." and "Ph.D.".

The anchor point determination module 306 can identify an anchor point associated with each term in a list of terms associated with a profile information type. Anchor points can correspond to selected job titles (or job roles) for which an organization or a recruiter seeks job candidates. In some instances, anchor points can correspond to job titles of special recruiting importance to the organization or the recruiter, such as job titles for which suitable job candidates are hardest to find. As just one example, selected job titles can include data scientist, software engineer (swe), designer, product manager, etc. The vector representations of the selected job titles in the vector space created by the model can constitute anchor points. In some embodiments, multiple job titles that refer to the same job function or job role can be resolved (or de-duped) into one job title associated with an anchor point. For example, when the job titles of "data science" and "data scientist" are determined by an organization or a recruiter to refer to the same or similar job function, these job titles can be reduced to one of the job titles and only one associated anchor point need be used.

The anchor point determination module 306 can apply each term in a list of terms associated with a profile information type to the model to identify the vector representation associated with the term. In some embodiments, for each vector representation of a term, a pairwise distance can be calculated with each respective anchor point. The calculation of distance can be based on any suitable technique, such a technique to measure cosine similarity, Hamming distance, Euclidean distance, etc. For each vector representation of a term, a nearest anchor point in the vector space can be identified. In some embodiments, a threshold distance value can be applied in the identification of a nearest anchor point to a vector representation of a term. The threshold distance value can be any suitable value. An anchor point identified by calculation of a distance that does not satisfy the threshold distance value can be discarded. In this regard, when a distance calculated for an anchor point nearest to a vector representation of a term in a list of terms associated with a profile information type exceeds the threshold distance value, the anchor point can be discarded. The application of a threshold distance value in the identification of an anchor point can reduce the likelihood that an incorrect job title will be identified for a term, such as a job title that is semantically unrelated to the term.

For each profile information type, the anchor point determination module 306 can create a list of anchor points. Each anchor point in the list is associated with a corresponding term in the list of terms associated with the profile information type. Continuing with the above example relating to the user who had a first job as an analyst, a second job as a software engineer (swe), and a third job as an analyst, a first list of anchor points can contain the anchor points "data scientist", "swe", and "data scientist" relating to the first type of profile information associated with, respectively, "analyst", "swe", and "analyst". A second list of anchor points can contain the anchor point "data scientist" relating to the second type of profile information associated with "statistics". A third list of anchor points can contain the anchor point "product manager" and no anchor point relating to the third type of profile information associated with, respectively, "B.S." and "Ph.D.". As the foregoing example is merely for purposes of illustration, other examples and other scenarios can result in different lists of anchor points.

The counting module 308 can count the number of occurrences of a unique anchor point in each list of anchor points associated with each profile information type. The anchor point with the highest number of occurrences in each list can be selected for the profile information type. Continuing with the above example relating to the user who had a first job as an analyst, a second job as a software engineer (swe), and a third job as an analyst, the counting module 308 can select "data scientist" from the first list of anchor points associated with the first type of profile information because "data scientist" occurs twice; "data scientist" from the second list of anchor points associated with the second type of profile information because no other anchor point is listed; and "product manager" from the third list of anchor points associated with the third type of profile information because no other anchor point is listed.

The job title determination module 310 can apply a rule that assigns a hierarchical level of importance to each profile information type and associated selected anchor point. The hierarchical level of importance assigned to a profile information type can reflect the relevance or weight of that profile information type in relation to the other profile information types in identifying a suitable job title for a user. In some embodiments, the rule can provide that the first type of profile information and associated selected anchor point is more important than the second type of profile information and the third type of profile information, and can provide that the second type of profile information and associated selected anchor point is more important than the third type of profile information. Based on the rule, an appropriate selected anchor point can be chosen. The chosen anchor point can constitute a suitable job title matched to the user associated with the profile information. Continuing with the above example relating to the user who had a first job as an analyst, a second job as a software engineer (swe), and a third job as an analyst, the job title determination module 310 can choose the selected anchor point "data scientist" relating to the first type of profile information based on a rule that the first type of profile information is more important than the second type of profile information and the third type of profile information. In this example, choosing the anchor point "data scientist" can constitute a determination of "data scientist" as a suitable job title for the user. In other examples, if no anchor point was selected or available in connection with the first type of profile information, the job title determination module 310 can choose the selected anchor point relating to the second type of profile information and, if not selected, the selected anchor point relating to the third type of profile information.

Figure 4:
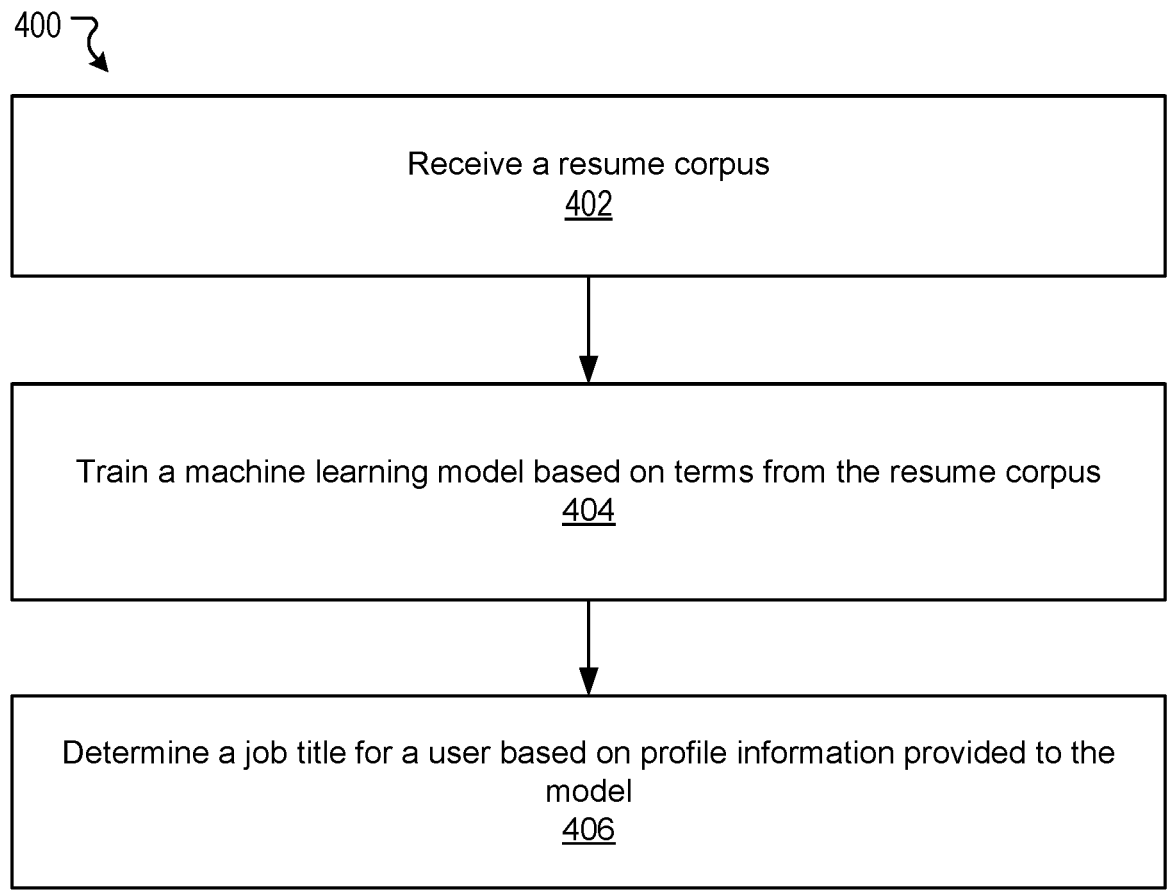
FIG. 4 illustrates a first method to determine a match between a user and a job title, according to an embodiment of the present technology.

FIG. 4 illustrates a first example method 400 to determine a match between a user and a job title, according to an embodiment of the present technology. It should be appreciated that there can be additional, fewer, or alternative steps performed in similar or alternative orders, or in parallel, in accordance with the various embodiments and features discussed herein unless otherwise stated.

At block 402, the method 400 can receive a resume corpus. At block 404, the method 400 can train a machine learning model based on terms from the resume corpus. At block 406, the method 400 can determine a job title for a user based on profile information provided to the model. Other suitable techniques that incorporate various features and embodiments of the present technology are possible.

Figure 5A:
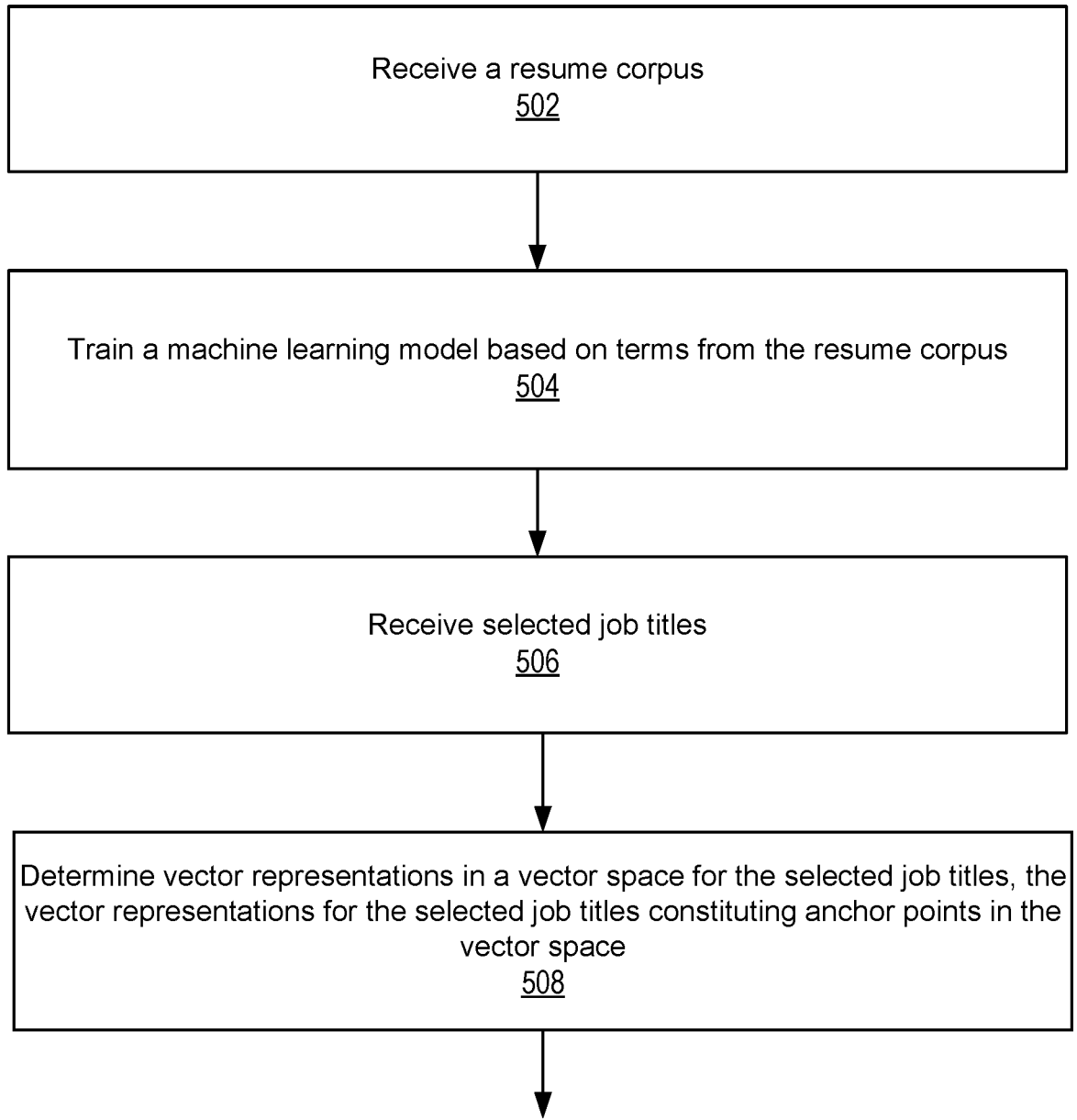
FIGS. 5A-5B illustrate a second method to determine a match between a user and a job title, according to an embodiment of the present technology.
Figure 5B:
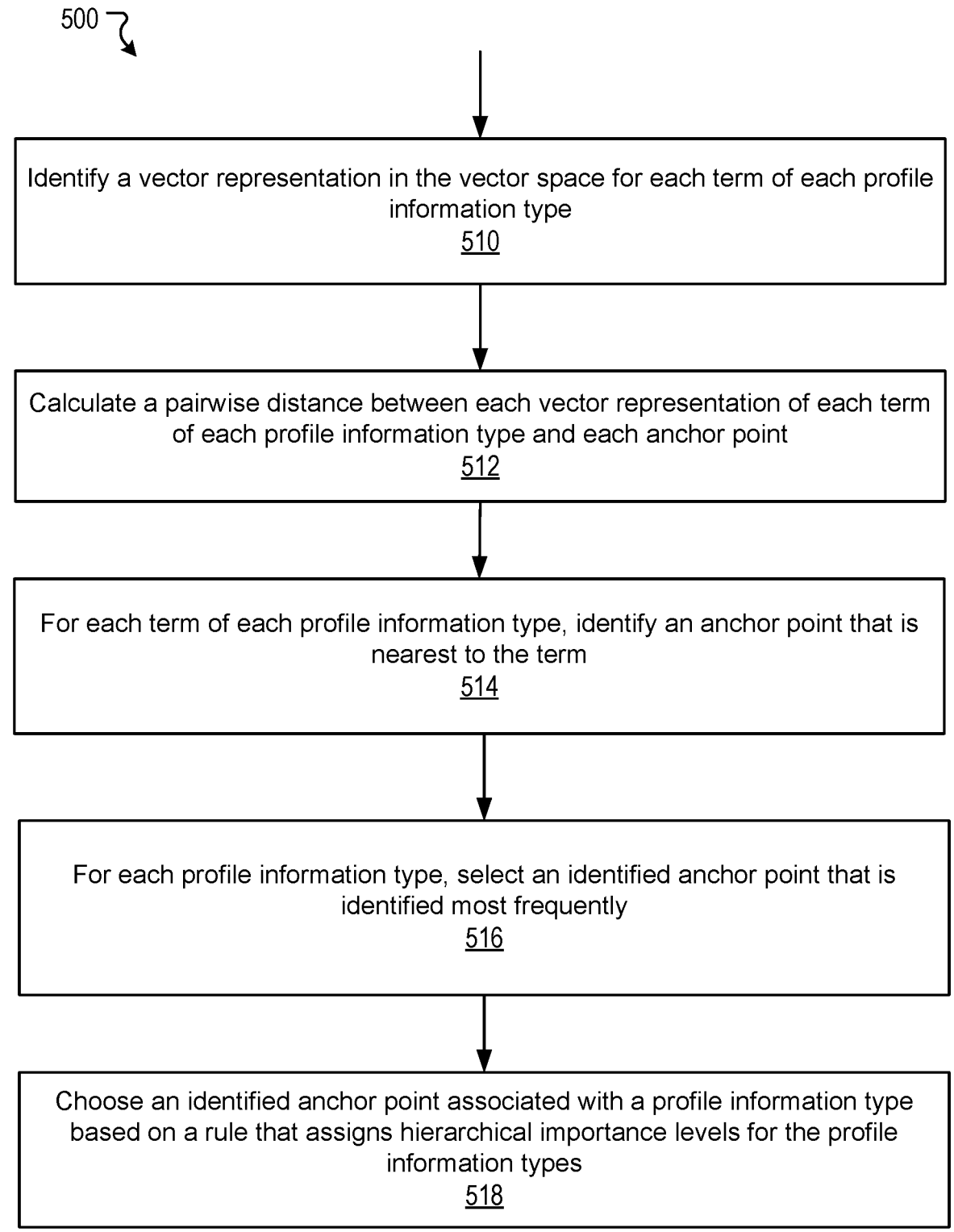

FIGS. 5A-5B illustrate a second example method 500 to determine a match between a user and a job title, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can receive a resume corpus. At block 504, the method 500 can train a machine learning model based on terms from the resume corpus. At block 506, the method 500 can receive selected job titles. At block 508, the method 500 can determine vector representations in a vector space for the selected job titles. The vector representations for the selected job titles can constitute anchor points in the vector space. At block 510, the method 500 can identify a vector representation in the vector space for each term of each profile information type. At block 512, the method 500 can calculate a pairwise distance between each vector representation of each term of each profile information type and each anchor point. At block 514, the method 500 can, for each term of each profile information type, identify an anchor point that is nearest to the term. At block 516, the method 500 can, for each profile information type, select an identified anchor point that is identified most frequently. At block 518, the method 500 can choose an identified anchor point associated with a profile information type based on a rule that assigns hierarchical importance levels for the profile information types. Other suitable techniques that incorporate various features and embodiments of the present technology are possible.

Social Networking System—Example Implementation

Figure 6:
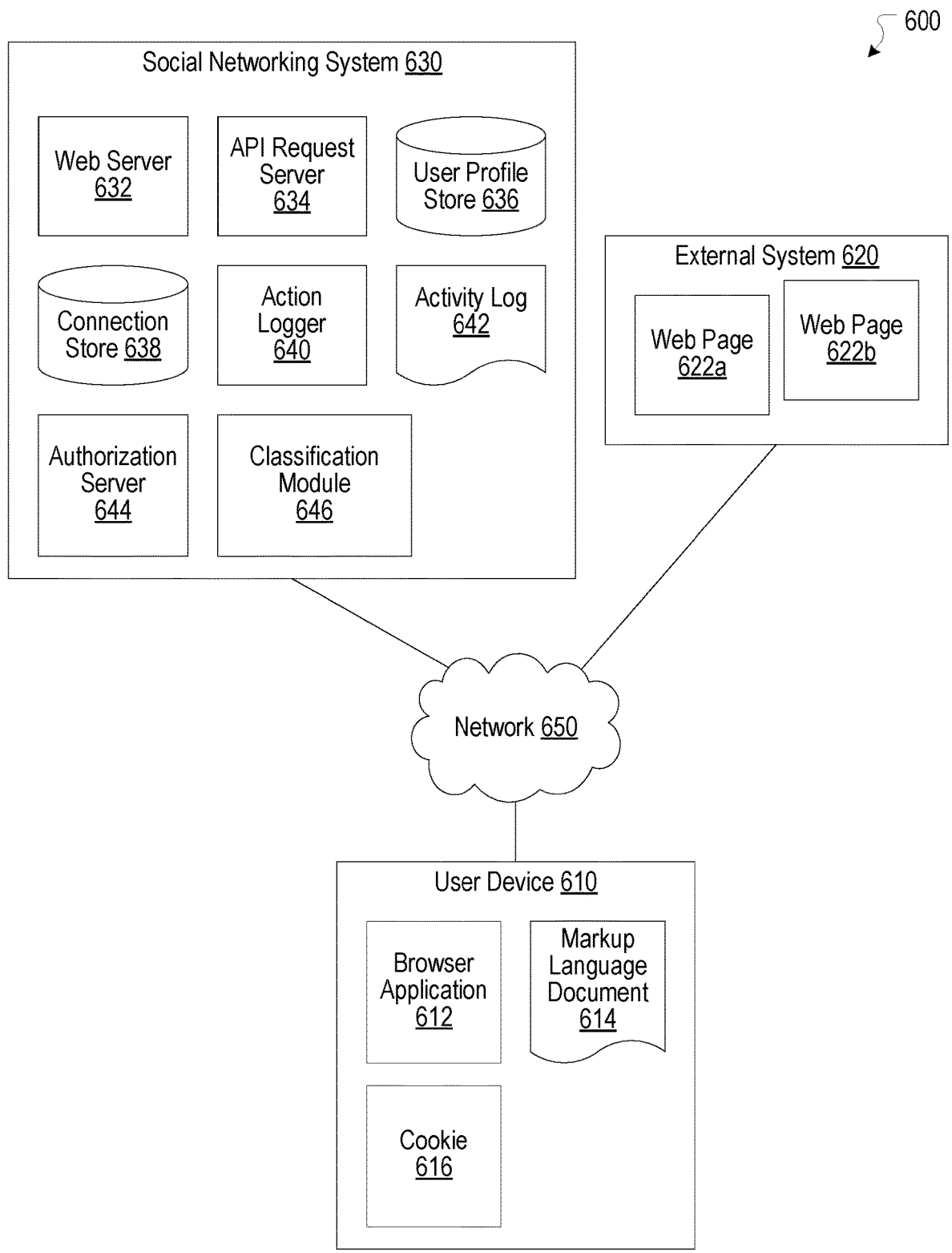
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 655. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 655. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 655. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 655, which may comprise any combination of local area and/or wide area networks, using wired and/or wireless communication systems.

In one embodiment, the network 655 uses standard communications technologies and protocols. Thus, the network 655 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 655 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 655 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 655. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 655.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 655. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system

620, in one embodiment, sends an API request to the social networking system 630 via the network 655, and the API request server 634 receives the API request. The API request server 634 processes the request by calling an API associated with the API request to generate an appropriate response, which the API request server 634 communicates to the external system 620 via the network 655. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a classification module 646. The classification module 646 can be implemented with the classification module 102, as discussed in more detail herein. In some embodiments, one or more functionalities of the classification module 646 can be implemented in the user device 610.

Hardware Implementation

Figure 7:
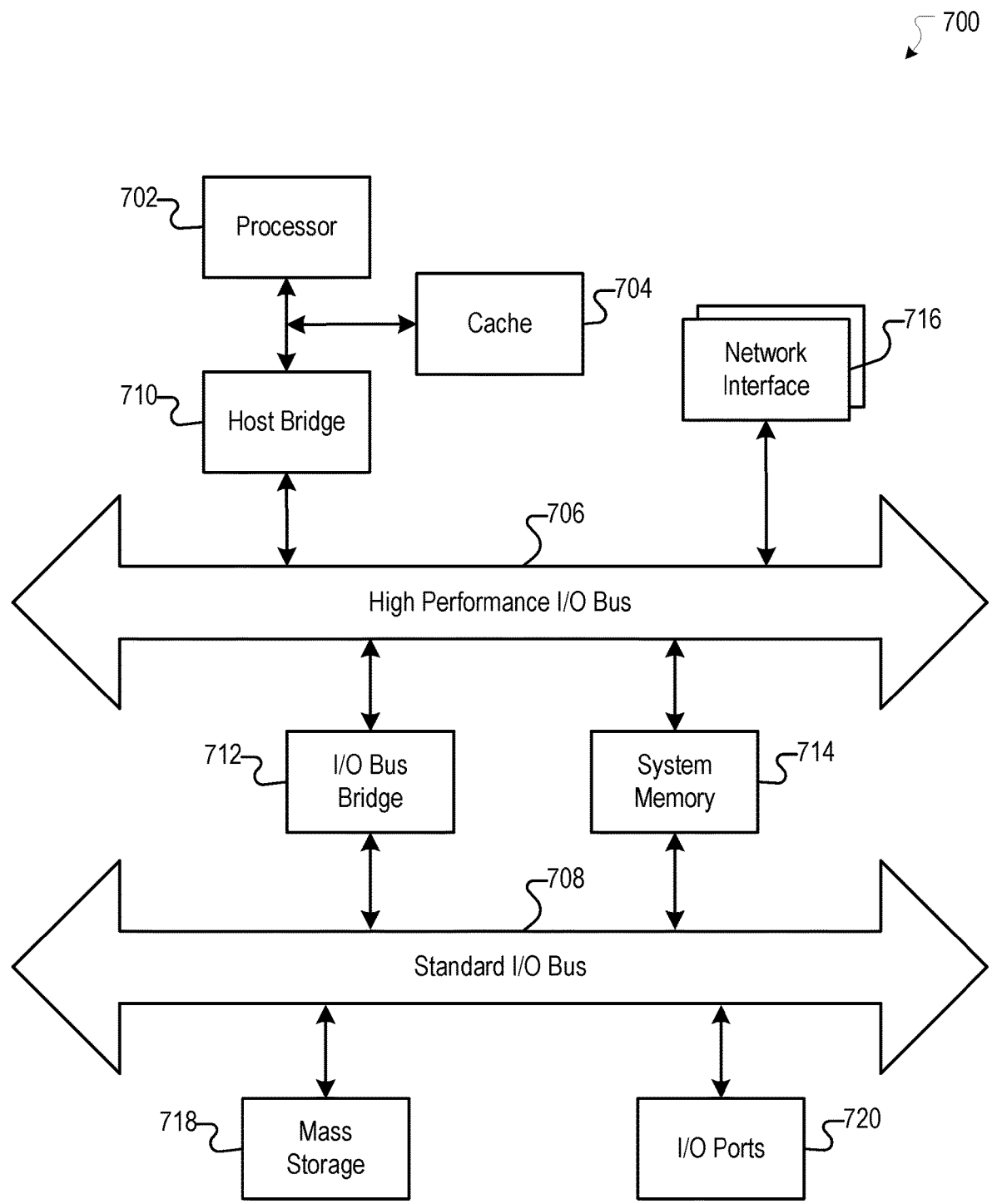
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, a resume corpus and selected job titles;
training, by the computing system, a machine learning model based on terms from the resume corpus, wherein the model is based at least in part on a technique that creates a set of vector representations of the terms from the resume corpus in a vector space based on semantics of the terms;
converting, by the computing system, based on the model, the selected job titles to a plurality of vector representations in the vector space based on semantics of the job titles, wherein the plurality of vector representations of the selected job titles constitute a plurality of anchor points in the vector space;
organizing, by the computing system, profile information of a user of a social networking system into profile information types that include at least one of profession, educational institution, educational major, or educational degrees;
identifying, by the computing system, based on the model, vector representations from the set of vector representations in the vector space for at least one term of at least one profile information type of a user of a social networking system; and
selecting, by the computing system, a first anchor point representing a first job title among the selected job titles matched to the user,
wherein the selecting is based on the vector representations in the vector space for the at least one term of the at least one profile information type of the user and the plurality of anchor points in the vector space, and
wherein the selecting is further based on a rule that assigns hierarchical importance levels for the profile information types.

2. The computer-implemented method of claim 1, wherein the user is associated with an employee of an organization recruiting for the job title.

3. The computer-implemented method of claim 2, wherein the user and the employee are connections on the social networking system.

4. The computer-implemented method of claim 1, wherein the selecting further comprises:
calculating a pairwise distance between each vector representation of each term of each profile information type and each anchor point.

5. The computer-implemented method of claim 4, wherein the selecting further comprises:
for each term of each profile information type, identifying an anchor point that is nearest to the term; and
for each profile information type, determining an identified anchor point that is identified most frequently.

6. The computer-implemented method of claim 5, wherein the identifying an anchor point further comprises:
applying a threshold distance value; and
discarding an anchor point identified from a calculation of pairwise distance when the pairwise distance does not satisfy the threshold distance value.

7. A system comprising:
at least one processor; and
a memory storing instructions that, when executed by the at least one processor, cause the system to perform:
receiving a resume corpus and selected job titles;
training a machine learning model based on terms from the resume corpus, wherein the model is based at least in part on a technique that creates a set of vector representations of the terms from the resume corpus in a vector space based on semantics of the terms;
converting based on the model, the selected job titles to a plurality of vector representations in the vector space based on semantics of the job titles, wherein the plurality of vector representations of the selected job titles constitute a plurality of anchor points in the vector space;
organizing profile information of a user of a social networking system into profile information types that include at least one of profession, educational institution, educational major, or educational degrees;
identifying, based on the model, vector representations from the set of vector representations in the vector space for at least one term of at least one profile information type of a user of a social networking system; and
selecting a first anchor point representing a first job title among the selected job titles matched to the user,
wherein the selecting is based on the vector representations in the vector space for the at least one term of the at least one profile information type of the user and the plurality of anchor points in the vector space, and wherein the selecting is further based on a rule that assigns hierarchical importance levels for the profile information types.

8. The system of claim 7, wherein the user is associated with an employee of an organization recruiting for the job title.

9. The system of claim 8, wherein the user and the employee are connections on the social networking system.

10. The system of claim 7, wherein the selecting further comprises:
calculating a pairwise distance between each vector representation of each term of each profile information type and each anchor point.

11. The system of claim 10, wherein the selecting further comprises:
for each term of each profile information type, identifying an anchor point that is nearest to the term; and
for each profile information type, determining an identified anchor point that is identified most frequently.

12. The system of claim 11, wherein the identifying an anchor point further comprises:
applying a threshold distance value; and
discarding an anchor point identified from a calculation of pairwise distance when the pairwise distance does not satisfy the threshold distance value.

13. A non-transitory computer-readable storage medium including instructions that, when executed by at least one processor of a computing system, cause the computing system to perform a method comprising:
receiving a resume corpus and selected job titles;
training a machine learning model based on terms from the resume corpus, wherein the model is based at least in part on a technique that creates a set of vector representations of the terms from the resume corpus in a vector space based on semantics of the terms;
converting based on the model, the selected job titles to a plurality of vector representations in the vector space based on semantics of the job titles, wherein the plurality of vector representations of the selected job titles constitute a plurality of anchor points in the vector space;
organizing profile information of a user of a social networking system into profile information types that include at least one of profession, educational institution, educational major, or educational degrees;
identifying, based on the model, vector representations from the set of vector representations in the vector space for at least one term of at least one profile information type of a user of a social networking system; and
selecting a first anchor point representing a first job title among the selected job titles matched to the user,
wherein the selecting is based on the vector representations in the vector space for the at least one term of the at least one profile information type of the user and the plurality of anchor points in the vector space, and
wherein the selecting is further based on a rule that assigns hierarchical importance levels for the profile information types.

14. The non-transitory computer-readable storage medium of claim 13, wherein the user is associated with an employee of an organization recruiting for the job title.

15. The non-transitory computer-readable storage medium of claim 14, wherein the user and the employee are connections on the social networking system.

16. The non-transitory computer-readable storage medium of claim 13, wherein the selecting further comprises:
calculating a pairwise distance between each vector representation of each term of each profile information type and each anchor point.

17. The non-transitory computer-readable storage medium of claim 16, wherein the selecting further comprises:
for each term of each profile information type, identifying an anchor point that is nearest to the term; and
for each profile information type, determining an identified anchor point that is identified most frequently.

18. The non-transitory computer-readable storage medium of claim 17, wherein the identifying an anchor point further comprises:
applying a threshold distance value; and
discarding an anchor point identified from a calculation of pairwise distance when the pairwise distance does not satisfy the threshold distance value.

* * * * *